United States Patent
Denk

Patent Number: 5,304,883
Date of Patent: Apr. 19, 1994

[54] RING WOUND STATOR HAVING VARIABLE CROSS SECTION CONDUCTORS

[75] Inventor: Joseph Denk, Los Angeles, Calif.

[73] Assignee: AlliedSignal Inc, Morris Township, Morris County, N.J.

[21] Appl. No.: 939,788

[22] Filed: Sep. 3, 1992

[51] Int. Cl.⁵ .................. H02K 1/00; H02K 1/12
[52] U.S. Cl. .................... 310/180; 310/258
[58] Field of Search .......... 310/180, 127, 258, 259, 310/260, 219, 223, 201, 194, 192, 58, 164, 267, 52, 193

[56] References Cited
U.S. PATENT DOCUMENTS

| | | |
|---|---|---|
| 3,743,875 | 7/1973 | Smith, Jr. et al. .............. 310/198 |
| 4,547,713 | 10/1985 | Langley et al. .............. 310/259 X |
| 4,563,606 | 1/1986 | Fukasawa et al. .............. 310/208 |
| 4,692,675 | 9/1987 | Falf .............. 318/138 X |
| 5,079,467 | 1/1992 | Dorman .............. 310/156 |

Primary Examiner—Steven L. Stephan
Assistant Examiner—E. To
Attorney, Agent, or Firm—Joseph R. Black; Robert A. Walsh

[57] ABSTRACT

Flux density in the air gap of an electrical machine is increased by varying the cross sectional area of conductors wound on the stator. Conductors of smaller cross sectional area are located within the air gap and conductors of larger cross sectional area are located outside the air gap. Because the smaller conductor allows the air gap to be reduced, air gap flux density is increased.

28 Claims, 5 Drawing Sheets

RING WOUND STATOR HAVING VARIABLE CROSS SECTION CONDUCTORS

BACKGROUND OF THE INVENTION

This invention relates in general to electrical machines and in particular to a ring wound stator of a permanent magnet machine.

The most important dimension for a permanent magnet electrical machine is the magnetic air gap between the surface of the rotor's magnet and the inner diameter of the stator's flux collector ring. An increase of flux density in the magnetic air gap will improve the operating performance of the machine, and it can result in a smaller, lighter machine. The higher flux density causes a greater torque reaction when the machine is operated as a motor, and it results in higher output rating when the machine is operated as a generator.

Air gap flux density can be increased by utilizing permanent magnets with higher energy product in the rotor.

SUMMARY OF THE INVENTION

Alternatively, the air gap flux density can be increased by reducing the magnetic air gap in an electrical machine comprising magnet means for providing magnetic flux and flux collector means for providing a flux return path for the magnetic flux. Windings around the flux collector means include a first portion that is located within the magnetic air gap between the magnet means and flux collector means. The windings further include a second portion that is located outside the magnetic air gap. The windings of said first portion have a smaller cross-sectional area than said windings of said second portion. Therefore, the flux return means can be moved closer to the magnet means, decreasing the magnetic air gap and increasing air gap flux density.

The windings of a polyphase machine can be segmented into half-phase sectors. Phase-to-phase barriers are disposed between half-phase sectors to allow for full phase-to-phase voltage at the phase boundaries.

DETAILED DESCRIPTION OF THE INVENTION

Figure 1:
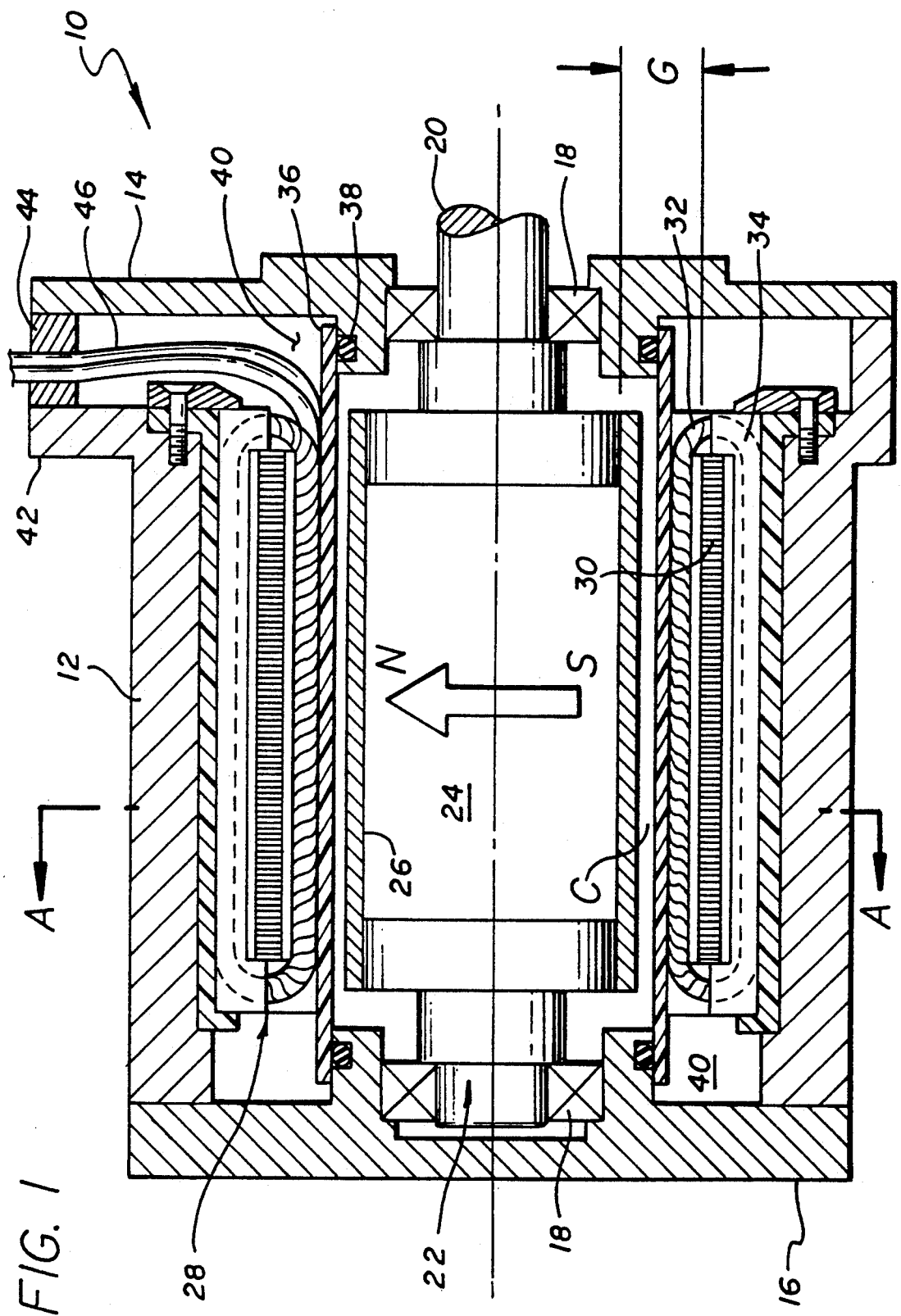
FIG. 1 is a cross-sectional view of a two-pole permanent magnet electrical machine including a toothless stator embodying the present invention.

Referring to FIG. 1, an electrical machine 10 includes a main housing 12 having front and rear endbells 14 and 16 which carry bearings 18. Journalled in the bearings 18 are the stub shafts 20 of a rotor 22. The shafts 20 rotate a cylindrical two pole permanent magnet 24 that is magnetized diametrically. Surrounding the magnet 24 is a retaining hoop 26. Construction of the rotor 22 is disclosed by Joseph Denk and Kenneth Wuertz in U.S. Pat. Nos. 4,667,123 ("TWO POLE PERMANENT MAGNET ROTOR CONSTRUCTION FOR TOOTHLESS STATOR ELECTRICAL MACHINE") and 4,741,094 ("TWO POLE PERMANENT MAGNET ROTOR CONSTRUCTION METHOD"), both of which patents are assigned to Allied-Signal, Inc., the assignee of the present invention.

Also disposed within the housing 12 is a ring wound stator 28 which surrounds the rotor 22. The stator 28 includes a laminated flux collector stack 30 which provides a flux return path for the flux lines provided by the magnet 24 of the rotor 22. The inner diameter of the stack 30 and the outer surface of the permanent magnet 24 define a magnetic air gap G (see also FIG. 2).

Wound around the stack 30 are stator windings 32 and 34 of variable cross section. Located within the magnetic air gap G are high current density conductors 32 ("inner" conductors 32), and located outside the magnetic air gap G are larger cross-section, lower current density conductors 34 ("outer" conductors 34). The outer conductors 34, with their greater thermal mass, provide a heat sink for the inner conductors 32, allowing for the inner conductors 32 to be cooled more efficiently. Their lower total resistance results in lower total $I^2R$ losses and higher efficiency.

More importantly, the inner conductors 32 allow the flux collector stack 30 to be moved closer to the permanent magnet 24. As a consequence, the magnetic air gap G is decreased and the air gap flux density is increased.

The stator 28 further includes an elongated bore seal 36 which, in cooperation with O-rings 38, seals the housing 12 to define an annular stator chamber 40. The housing 12 provides inlet and outlet ports (not shown) which allow a gaseous or liquid coolant to flow into the stator chamber 40 and cool the conductors 32 and 34. Alternatively, the conductors 32 and 34 could be cooled by thermal lag for short duty cycle. The bore seal 36 and retaining hoop 26, both of which are located in the air gap G, define a mechanical running clearance C. The housing 12 also defines an outwardly extending boss 42. Passing through a hermetic seal 44 in the boss 42 are power leads 46, which supply electrical power to, or receive electrical power from, the windings 32 and 34 of the stator 28.

Figure 2:
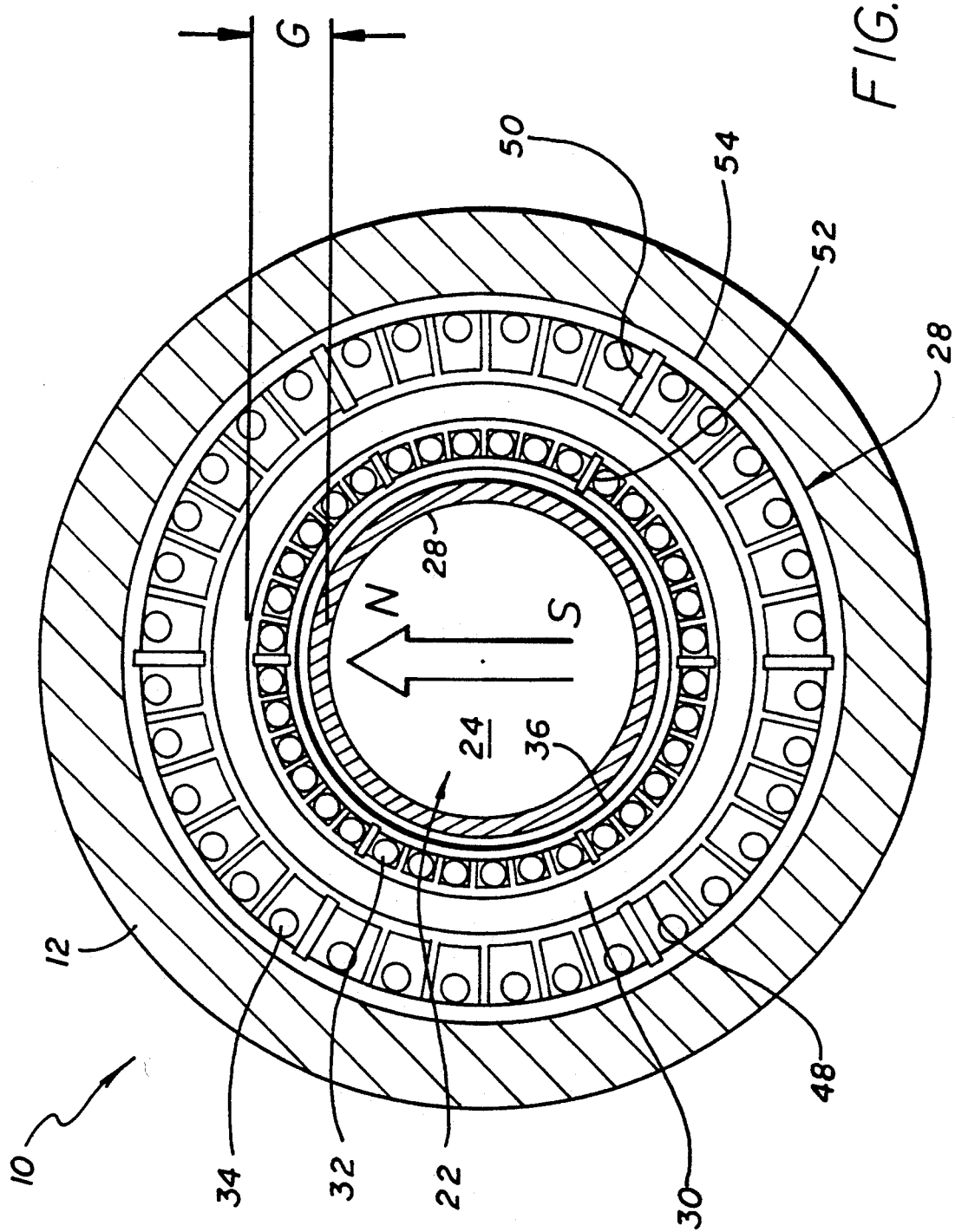
FIG. 2 is a cross-sectional view, taken along lines A—A, of the machine shown in FIG. 1.

FIG. 2 shows the stator 28 in greater detail. For the purposes of illustration only, the stator 28 is described as being a toothless type for a three phase, two pole machine.

The laminated flux collector stack 30 is a solid ring made of a magnetically permeable material such as silicon steel. Encasing the stack 30 is a bobbin 48 made of an insulating material that provides high temperature capability, effective electrical insulation and good thermal conductivity to enhance iron loss heat removal. Alternatively, the stack 30 could be made of segments whose ends abut each other. While easier to manufacture and install, the segmented stack provides the undesirable effect of magnetic cogging at its abutting ends.

The stator windings 32 and 34 are toroidally wrapped around the bobbin 48. For a three phase, two pole machine, the windings 32 and 34 are segmented into six half-phase sectors (A,A',B,B',C,C'), each sector covering 60 electrical and mechanical degrees.

Preferably, the outer conductors 34 are configured as elongated copper bars that are longitudinally arranged about the outer surface of the bobbin 48. The bars can be solid since they are removed from the flux path. "Turn-to-turn" insulation of the outer conductors 34 is provided either by spraying the sides of the bars with an insulating paint having high temperature capability (e.g., aluminum oxide) or by placing an insulating leaf (62, see FIG. 5) between adjacent bars. Thickness of the paint or leaf depends upon the turn-to-turn voltage. If this voltage is low, little insulation is required.

The configuration of the outer conductors 34 is not limited to copper bars. Alternatively, the outer conductors 34 can be made of Litz cable having a larger gauge than the inner conductors 32.

The inner conductors 32 are made of multiple fine stranded Litz cable. Each strand is insulated to provide strand-to-strand insulation to reduce eddy current losses. The strands are fully transposed for the effective magnetic length of the stator 28 to eliminate circulating current losses within the inner conductors 32. The use of Litz wire is required for high speed toothless stator designs; because all of the machine flux penetrates the inner conductors 32, the eddy and circulating current losses could be prohibitive. Each Litz cable segment of the inner conductor 32 is connected to the outer conductor 34.

The most reliable stator configuration uses only a single layer of inner conductors 32 wrapped around the bobbin 48. A minimal number of high current density, ampere-conductors disposed in the air gap G allows the stack 30 to be placed as close to the rotor surface as possible. Further, a single layer can be cooled with the greatest efficiency. Still, designs using more than a single layer of variable cross-section conductors are feasible.

Phase-to-phase barriers 50 and 52 are disposed between half-phase sectors (A-C') to allow for full phase-to-phase voltage at the phase boundaries. Located between the outer conductors 34, the barriers 50 are keyed into longitudinal grooves on the outer surface of the bobbin 48 and longitudinal grooves on the inner surface of a retainer 54, which surrounds the outer conductors 34. The retainer 54 insulates the outer conductors 34 from the housing 12. Located between the inner conductors 32, the barriers 52 are keyed into longitudinal grooves on the inner surface of the bobbin 48 and longitudinal grooves on the outer surface of the bore seal 36. The barriers 50 and 52 extend radially from the rotor 22. The bore seal 36, barriers 50 and 52 and retainer 54 are all made of stable, high temperature insulating material such as "VESPEL", a polyamide available from E. I. duPont. Thicknesses depend upon the amount of insulation required to prevent breakdown between the phases. Alternatively, the retainer 54 can be made of an electrical insulating material having high thermal conductivity to conduct heat to the main housing 12. Such a material can be alumina or boron nitride.

Figure 3:
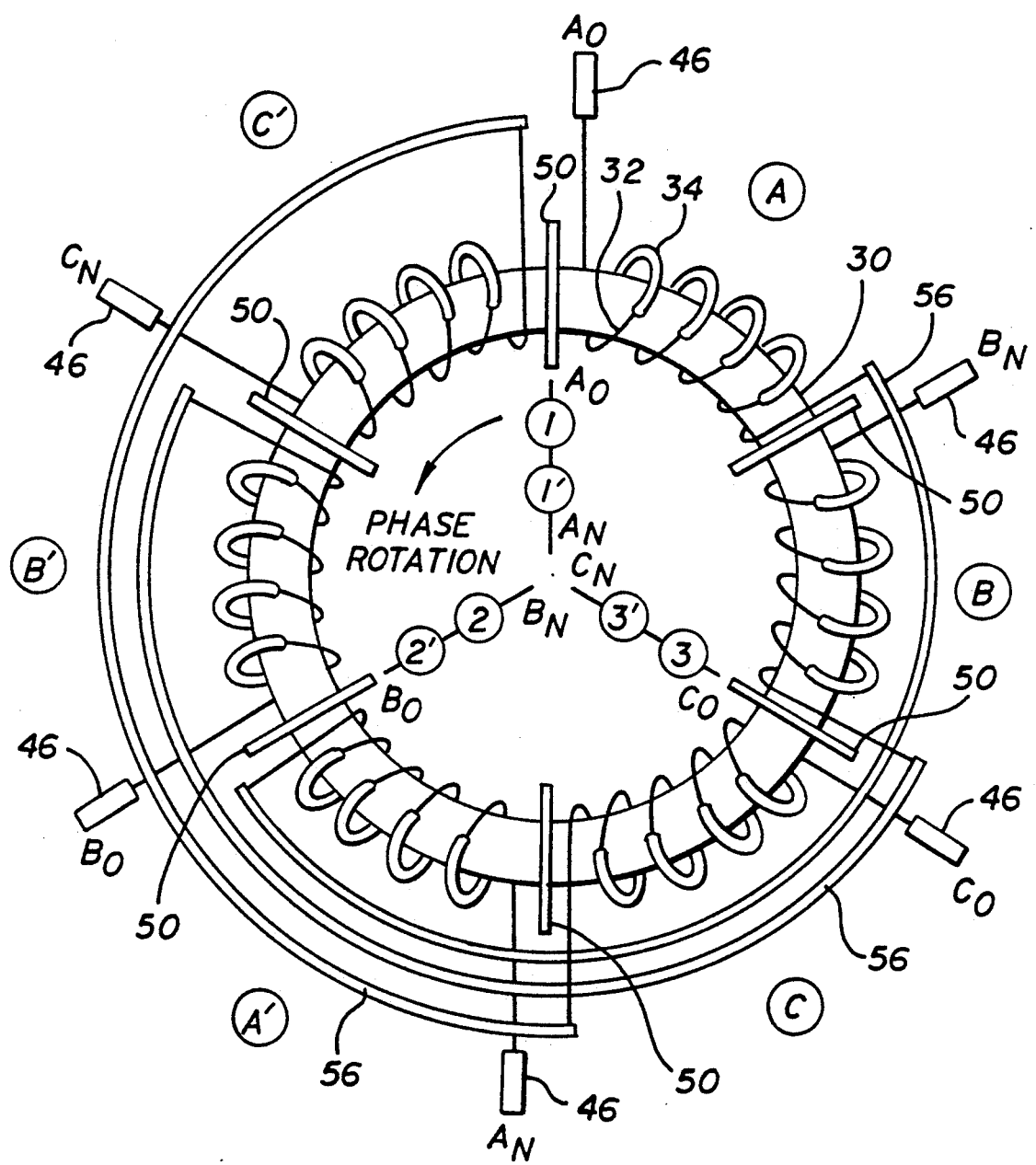
FIG. 3 is a wiring diagram for the stator.

Referring now to FIG. 3, a phase is completed by electrically connecting the finish of one half-phase sector is to the finish of its opposite half-phase sector (A—A', B—B', C—C') with large cross-section jumpers 56. The completed phases are connected to the large cross-section power leads 46.

Thus disclosed is an improved ring wound stator 28. Ring wound stators in general have certain advantages over conventional stators. For one, ring wound stators are more compact than conventionally wound stators. In the latter stator, the windings define end-turn portions connecting successive axial sections of the stator windings. These end turn portions extend axially a considerable distance beyond the stator flux return path. Because the stator collector stack and rotor permanent magnet are of similar length, with the stator stack being slightly the longer to control axial flux loss, the end turn portions of the stator windings substantially increase the overall length of the electrical machine. This is especially true for two pole designs. In contrast, the end turns of the ring wound stator extend only a short distance axially beyond the ends of the flux return path. Thus, the length of the ring wound stator is shorter.

The present invention offers advantages over known ring wound stators. The inner and outer conductors 32 and 34 may be cooled directly with liquid or gas. These conductors 32 and 34, as well as the flux collector stack 30 itself may, if desired, define structural features increasing the heat transfer surface and cooling effective from the liquid or gas coolant.

Because each half-phase sector fully insulated at its boundaries and full turn-to-turn insulation can be provided, the ring wound stator 28 can be operated with greater reliability in severe environments and/or designs with higher voltages. Thus, the ring wound stator 28 displays greater reliability than conventionally wound stators.

Additionally, the smaller inner conductors 32 allow the flux collector stack 30 to be moved closer to the permanent magnet 24. As a result, the air gap G is reduced and air gap flux density is increased.

Figure 4:
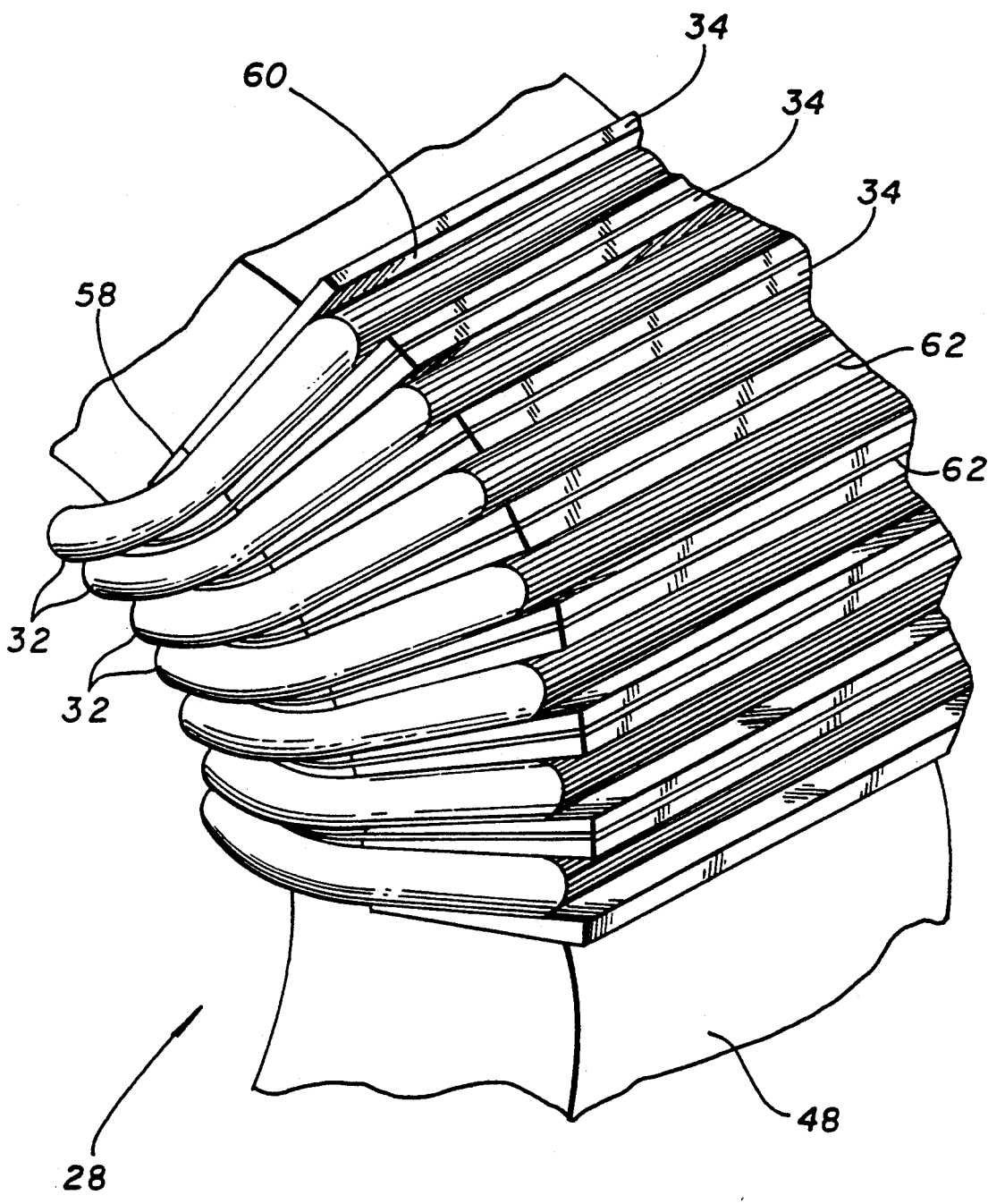
FIG. 4 is an isometric view of the stator under construction.

FIG. 4 depicts the conductors 32 and 34 being wound around the bobbin 48. The inner conductors 32 are multistrand Litz cable, and the outer conductors 34 are copper bars. The copper bars are placed longitudinally on the bobbin 48, with their ends 58 straddling the sides of the bobbin 48. The ends 58 of each bar extend radially inward, towards the rotor 22. However, they extend only half way down to prevent flux end leakage from cutting into the bars. A channel 60 runs the length of each bar. Insulating leaves 62 are disposed between the bars. The Litz cable is toroidally wound around the bobbin 48, laying within the channel 60 and running across the inner surface of the bobbin 48. Prior to winding the Litz cable, however, insulation is stripped from those portions of the cable lying in the channel 60. To facilitate the step of stripping the insulation, the portions of Litz cable lying in the channel 60 can be broken. After the Litz cable 32 is wound, the channels 60 are filled with a 95-5 solder or other suitable brazing material to make a good electrical connection between the cable and the bars. When the channels 60 have been filled, the outer surface of the stator 28 resembles that of a commutator.

Figure 5:
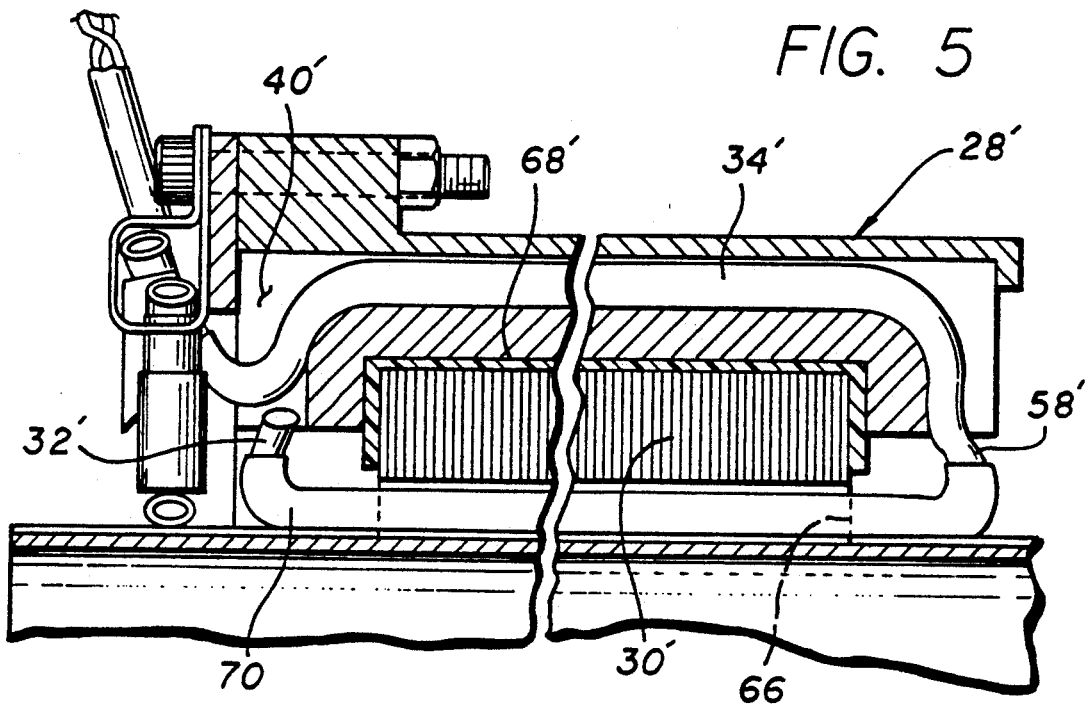
FIG. 5 is a cross-sectional view of a toothed stator according to the present invention.
Figure 6:
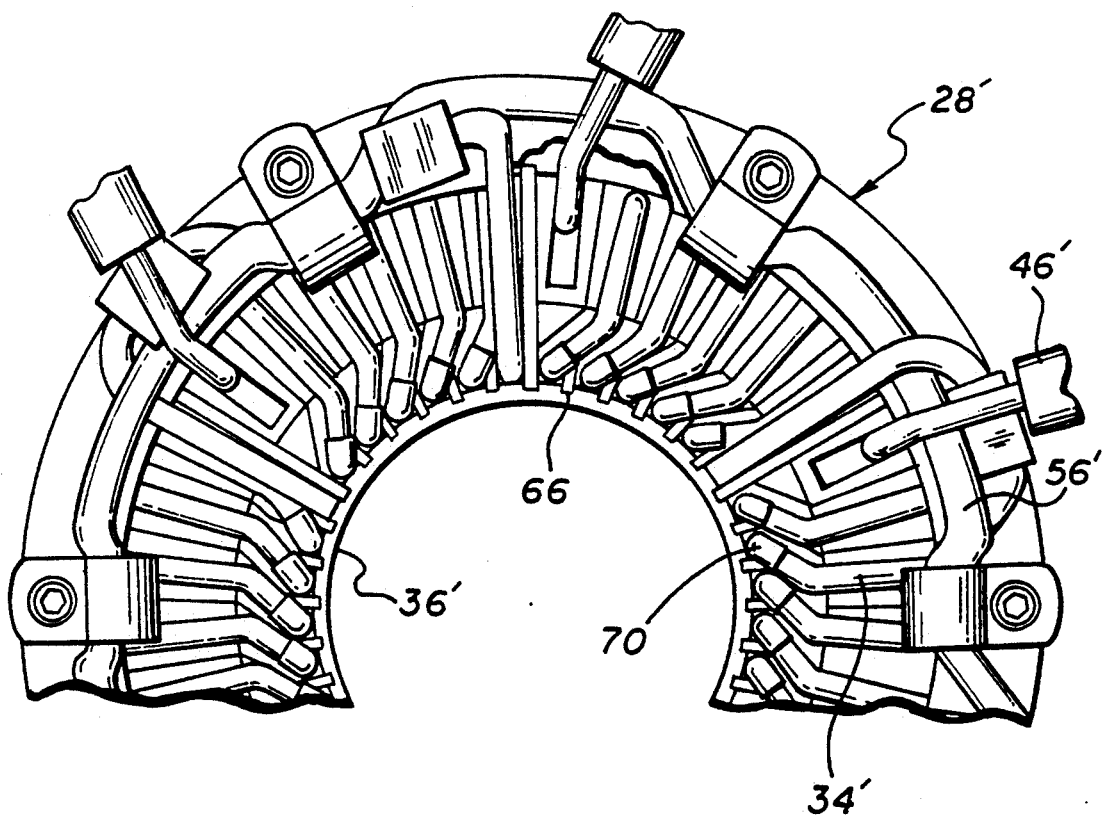
FIG. 6 is a fragmentary lateral view of the toothed stator.

Different variations of the stator 28 are possible. FIGS. 5 and 6 show a tooth-type stator 28' including a plurality of radially inwardly extending teeth 66 which are received in longitudinal grooves on the outer surface of the bore seal 36'. Because of the teeth 66, the stack 30' cannot be insulated by a bobbin. Instead, the stack 30' is insulated by individual U-shaped layers 68 that are laid between the stack 30' and the outer conductors 34'. The inner conductors 32' extend between the teeth 66 and into sleeves 70 made of insulative material. The conductors 32' are devoid of insulation in those areas where it is not extending between teeth 66, that is, at the ends 58' of the outer conductors 34'. The winding fabrication method is identical to the procedure described in connection with FIG. 5 for the toothless stator 28. Gas or liquid enters into the chamber 40', cooling the stack 30', teeth 66 and conductors 32' and 34'.

In alternative embodiments, the machine flux can be provided by means other than the two pole permanent magnet. For example, the two pole rotor can be excited electromagnetically (synchronously or by induction). Or, the rotor can be made as a four pole permanent magnet or electromagnet. However, the two pole permanent magnet is preferred because it provides the greatest flux density and highest efficiency. Further, the stator can be adapted to a machine 10 having two, three, six, nine or any other number of phases, and it can have separate windings.

Therefore, it will be understood that these embodiments are merely exemplary and that a person skilled in the art may make many variations and modifications without departing from the spirit and scope of the invention. All such modifications are intended to be included within the scope of the invention as defined in the appended claims.

I claim:

1. An electrical machine, comprising:
   magnet means for providing magnetic flux;
   flux collector means for providing a flux return path for said magnetic flux, said magnet means and flux collector means defining a magnetic air gap therebetween; and
   windings around said flux collector means, a first portion of said windings being located within said magnetic air gap, and a second portion of said windings being located outside said magnetic air gap, said windings of said first portion having a smaller cross-sectional area than said windings of said second portion.

2. The machine of claim 1, wherein said magnet means includes a two pole permanent magnet.

3. The machine of claim 1, wherein said flux collector means includes a ring of magnetically permeable material.

4. The machine of claim 3, wherein said ring is toothless.

5. The machine of claim 3, wherein said ring has a plurality of radially inner axially extending and regularly circumferentially arrayed tooth portions, said tooth portions interposing circumferentially between successive turns of said windings of said first portions thereof, whereby said ring is toothed.

6. The machine of claim 1, further including a housing for said flux collector means and said magnet means, said housing providing an airtight chamber for said flux collector means and said windings, said housing further providing inlet and outer ports to said chamber.

7. The machine of claim 1, wherein said windings of said first portion form single layer.

8. The machine of claim 1, wherein said windings of said second portion are low current density conductors.

9. The machine of claim 8, wherein said low current density conductors are elongated bars of electrically conductive material.

10. The machine of claim 1, wherein said windings of said first portion are high current density conductors.

11. The machine of claim 10, wherein said high current density conductors are multiple stranded Litz cable.

12. The machine of claim 1, wherein said machine is a polyphase machine and wherein said windings are segmented into half phase sectors.

13. The machine of claim 12, further comprising means for isolating said half phase sectors at their phase boundaries.

14. The machine of claim 13, wherein said isolating means includes phase-to-phase barriers disposed between said half phase sectors.

15. An electrical machine, comprising:
   a magnet;
   a flux collector ring encircling said magnet, opposing surfaces of said flux collector ring and said magnet defining a magnetic air gap; and
   windings that are toroidally wound around said flux collector ring, a first portion of said windings being located within said magnetic air gap, and a second portion of said windings being located outside said magnetic air gap, said windings of said first portion having a smaller cross-sectional area than said windings of said second portion.

16. The machine of claim 15, wherein said machine is a polyphase machine and wherein said windings are segmented int o half phase sectors.

17. The machine of claim 16, further comprising means for isolating said half phase sectors.

18. The machine of claim 17, wherein said flux ring is toothless, and wherein said isolating means further includes:
   a bobbin encasing said flux collector ring;
   an inner sleeve member received concentrically within said flux collector ring;
   an outer sleeve member surrounding said flux collector ring;
   a first set of barriers disposed between said first portion of windings and keyed into said inner sleeve member and said bobbin; and
   a second set of barrier disposed between said second portion of windings and keyed into said bobbin and said outer sleeve member.

19. The machine of claim 15, wherein said windings of said first portion are high current density conductors and wherein said windings of said second portion are low current density conductors.

20. The machine of claim 19, wherein said high current density conductors include multiple stranded Litz cables, and wherein said low current density conductors include electrically conductive bars.

21. The machine of claim 15, wherein said windings of said first portion form single layer.

22. An electrical machine, comprising a housing; a rotor, journalled for rotation within said housing, including a two pole permanent magnet; and a stator including:
   a flux collector ring encircling said magnet, opposing surfaces of said flux collector ring and said magnet defining a magnetic air gap; and
   windings that are toroidally wound around said flux collector ring, said windings including a single layer of high current density conductors located within said magnetic air gap and low current density conductors connected between said high current density conductors, said high current density conductors having a smaller cross-sectional area than said low current density conductors.

23. The machine of claim 22, wherein said machine is a polyphase machine and wherein said windings are segmented into half phase sectors.

24. The machine of claim 23, wherein said flux ring is toothless and wherein said stator further includes isolating means for isolating said half phase sectors, said isolating means including:
   a bobbin encasing said flux collector ring;

an inner sleeve member received concentrically within said flux collector ring;

an outer sleeve member surrounding said flux collector ring;

a first set of barriers disposed between said high current density conductors and keyed into said inner sleeve and said bobbin; and a second set of barrier disposed between said low current density conductors and keyed into said bobbin and said outer sleeve.

25. The machine of claim 22, wherein said housing includes means for providing an airtight chamber for said flux collector ring and said windings, said housing further providing inlet and outer ports that are in fluid communication with said chamber.

26. A ring wound stator, comprising:

a flux return ring having an inner surface and an outer surface; and electrical windings toroidally wound around said ring, a first portion of said windings being in communication with said inner surface, a second portion of said windings being in communication with said outer surface, said windings of said first portion having a smaller cross-sectional area than said windings of said second portion.

27. The machine of claim 26, wherein said windings of said first portion are high current density conductors and wherein said windings of said second portion are low current density conductors.

28. The machine of claim 27, wherein said high current density conductors include multiple stranded Litz cables, and wherein said low current density conductors include electrically conductive bars.

* * * * *